United States Patent
Deng et al.

(10) Patent No.: US 10,649,460 B2
(45) Date of Patent: May 12, 2020

(54) INTERACTIVE ROBOTS POSITIONABLE FOR OPTIMAL INTERACTIONS

(71) Applicant: Facebook, Inc., Menlo Park, CA (US)

(72) Inventors: Eric Deng, Fremont, CA (US); Andrew Gold, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 100 days.

(21) Appl. No.: 15/811,916

(22) Filed: Nov. 14, 2017

(65) Prior Publication Data

US 2019/0146518 A1     May 16, 2019

(51) Int. Cl.
| | |
|---|---|
| *G05D 1/00* | (2006.01) |
| *G05D 1/02* | (2020.01) |
| *B25J 19/02* | (2006.01) |
| *G06K 9/00* | (2006.01) |
| *G06T 7/246* | (2017.01) |
| *G06T 7/292* | (2017.01) |
| *G06T 7/73* | (2017.01) |

(Continued)

(52) U.S. Cl.
CPC ........ *G05D 1/0246* (2013.01); *B25J 11/0005* (2013.01); *B25J 19/023* (2013.01); *B25J 19/026* (2013.01); *G05D 1/0255* (2013.01); *G06K 9/00362* (2013.01); *G06K 9/00664* (2013.01); *G06K 9/209* (2013.01); *G06K 9/2054* (2013.01); *G06K 9/3233* (2013.01); *G06T 7/248* (2017.01); *G06T 7/292* (2017.01); *G06T 7/74* (2017.01); *G06K 9/00255* (2013.01); *G06K 9/00308* (2013.01); *G06K 2209/21* (2013.01); *G06T 2210/22* (2013.01); *Y10S 901/01* (2013.01)

(58) Field of Classification Search
CPC ... G05D 1/0246; G05D 1/0255; B25J 19/023; B25J 19/026; G06K 9/00255; G06K 9/00664; G06K 9/00308; G06K 9/209; G06K 9/2054; G06K 9/00362; G06K 2209/21; Y10S 901/01; G06T 2210/22; G06T 7/74; G06T 7/292; G06T 7/248
See application file for complete search history.

(56) References Cited

U.S. PATENT DOCUMENTS

2019/0043327 A1 * 2/2019 Stent ................ G08B 13/19647
2019/0096069 A1 * 3/2019 Qian .......................... G06T 7/74

FOREIGN PATENT DOCUMENTS

WO   WO 2019/019147   * 7/2017

OTHER PUBLICATIONS

Schmitt et al. "Cooperative Probabilistic State Estimation for Vision-based Autonomous Mobile Robots", IEEE Transactions on Robotics and Automation, 18(5):670-684 (Year: 2002).*

* cited by examiner

*Primary Examiner* — Qian Yang
(74) *Attorney, Agent, or Firm* — FisherBroyles, LLP

(57) ABSTRACT

A system may include a robot that includes (1) an imaging device that generates image data corresponding to a field of view of the imaging device and (2) a mobility subsystem that moves the robot. The system may also an imaging subsystem that (1) tracks the image data, (2) detects an object of interest in the field of view of the imaging device, and (3) generates region-of-interest image data that includes only a portion of the tracked image data corresponding to a region of interest. Additionally, the system may include a positioning subsystem that (1) determines an initial proximity of the robot to the object of interest and (2) determines a target location for the robot. Various other robots, systems, and methods are also disclosed.

20 Claims, 7 Drawing Sheets

(51) Int. Cl.
G06K 9/20 (2006.01)
B25J 11/00 (2006.01)
G06K 9/32 (2006.01)

INTERACTIVE ROBOTS POSITIONABLE FOR OPTIMAL INTERACTIONS

BACKGROUND

Advances in robotics technology have resulted in the increasing use of robots in a variety of situations to carry out a multitude of activities. Various types of robots are commonly used in industry to improve productivity and reduce costs. Robots may also improve the health and safety of individuals by performing tasks in harsh or dangerous environments. Robots are also frequently used to perform many repetitive tasks that may be undesirable or for which there may be little room for error. While robots are often well-suited for performing automated repetitive tasks in environments that do not involve interactions with individuals, robots are often ill-equipped for interacting or facilitating interactions with people or other autonomous robots.

SUMMARY

As will be described in greater detail below, the instant disclosure generally relates to robots, and systems and methods for positioning robots for optimal interactions in interactive environments. In one example, a system may include a robot having (1) an imaging device that generates image data corresponding to a field of view of the imaging device, the imaging device including an imaging sensor that receives light from the field of view of the imaging device, and (2) a mobility subsystem that moves the robot. The system may also include an imaging subsystem that (1) tracks the image data corresponding to the field of view of the imaging device, (2) detects an object of interest in the field of view of the imaging device based on at least one feature of the object of interest, and (3) generates region-of-interest image data that includes only a portion of the tracked image data corresponding to a region of interest of the field of view of the imaging device including the object of interest and a selected area surrounding the object of interest. Additionally, the system may include a positioning subsystem that (1) determines an initial proximity of the robot to the object of interest based on the region-of-interest image data, and (2) determines a target location for the robot based on the initial proximity of the robot to the object of interest and a target proximity of the robot to the object of interest. The mobility subsystem may move the robot to the target location.

According to some embodiments, the imaging subsystem may generate the region-of-interest image data by digitally cropping the tracked image data to include only a portion of the tracked image data from a sub-region of the imaging sensor that receives light from the region of interest. In this example, the sub-region of the imaging sensor corresponding to the region-of-interest may increase as the mobility subsystem moves the robot toward the object of interest. Additionally or alternatively, the sub-region of the imaging sensor corresponding to the region-of-interest may decrease as the mobility subsystem moves the robot away from the object of interest.

In at least one embodiment, the robot may further include an additional imaging device and the imaging subsystem may generate the region-of-interest image data by adjusting a lens assembly of the additional imaging device such that the field of view of the additional imaging device includes only the region-of-interest. In this example, the imaging subsystem may adjust the lens assembly of the additional imaging device to increase the field of view of the additional imaging device as the mobility subsystem moves the robot toward the object of interest. Additionally, the imaging subsystem may adjust the lens assembly of the additional imaging device to decrease the field of view of the additional imaging device as the mobility subsystem moves the robot away from the object of interest.

According to at least one embodiment, the robot may further include a display area and the robot may receive display data from at least one external computing device that is separate from the robot. In this example, the robot may display images in the display area based on the received display data. In some examples, the mobility subsystem may orient the robot such that the images displayed in the display area are optimally visible at the vantage point of the object of interest. Additionally or alternatively, the display subsystem may change the size of at least one image displayed in the display area as the mobility subsystem moves the robot toward the target location.

In some embodiments, the positioning subsystem may identify one or more features of the object of interest based on at least one frame of at least one of the tracked image data or the region-of-interest image data. In this example, the positioning system may select the target proximity of the robot to the object of interest based on the one or more features of the object of interest. In at least one example, the object of interest may include at least a portion of a person. For example, the object of interest may include the person's face. In this example, the imaging subsystem may detect the person's face by facial recognition based on the tracked image data. In some examples, the positioning subsystem may determine a likely emotional state of the person and may select the target proximity of the robot to at least the portion of the person based on the likely emotional state of the person. In at least one embodiment, the object of interest may include a tracked feature of another robot.

According to at least one embodiment, the system may include an audio subsystem that generates audio data based on sounds received by at least one audio sensing device of the robot from a local area of the robot. In this example, the audio subsystem may detect at least one sound emitted by the object of interest and the mobility subsystem may position the robot so that the object of interest is disposed in the field of view of the imaging device. In some examples, the positioning subsystem may determine at least one of the initial proximity of the robot to the object of interest or the target location of the robot based on the at least one sound emitted by the object of interest.

According to some embodiments, the imaging subsystem may detect a plurality of objects of interest in the field of view of the imaging device and the positioning subsystem may determine an optimal orientation of the robot relative to the plurality of objects of interest. In at least one embodiment, the imaging subsystem may include a plurality of imaging devices and the positioning subsystem may further determine the initial proximity of the robot to the object of interest based at least partially on image data tracked by each of the plurality of imaging devices. In some examples, the imaging subsystem and the positioning subsystem may each located on at least one of the robot or at least one external computing device that is separate from the robot.

A corresponding system may include (1) a robot, (2) an imaging subsystem, (3) a positioning subsystem, and (4) an external computing device that displays at least one of tracked image data or region-of-interest image data in a display area that is separate from the robot.

A corresponding method may include (1) tracking image data corresponding to a field of view of an imaging device of a robot, the imaging device including an imaging sensor that receives light from the field of view of the imaging device, (2) detecting an object of interest in the field of view of the imaging device based on at least one feature of the object of interest, (3) generating region-of-interest image data that includes only a portion of the tracked image data corresponding to a region of interest of the field of view of the imaging device that includes the object of interest and a selected area surrounding the object of interest, (4) determining an initial proximity of the robot to the object of interest based on the region-of-interest image data, (5) determining a target location for the robot based on the initial proximity of the robot to the object of interest and a target proximity of the robot to the object of interest, and (6) moving the robot to the target location.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
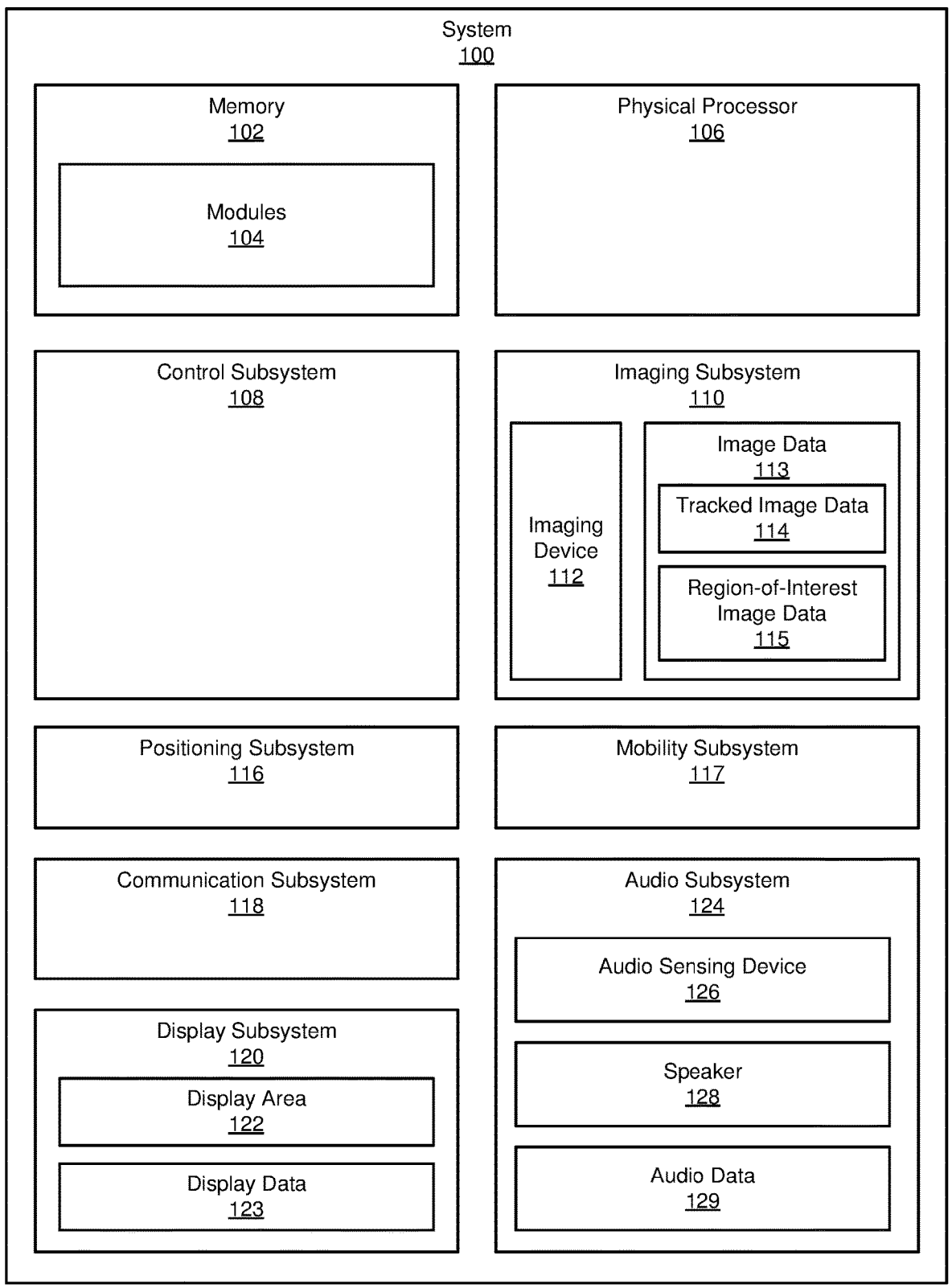
FIG. 1 is a block diagram of an exemplary robot in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to robots, and systems and methods for positioning robots for optimal interactions in interactive environments. As will be explained in greater detail below, embodiments of the instant disclosure may include robots that may be positioned in a target location with respect to an object of interest (e.g., at least a portion of a person, another robot, and/or any other suitable object of interest). The target location may be determined by the robot using an imaging device that may also be utilized to generate image data for additional purposes, such as capturing image data and/or providing image data to a remote user at an external computing device. Image data generated by the imaging device may be tracked and utilized to generate region-of-interest image data that includes only a portion of tracked image data corresponding to a region of interest of a field of view of the imaging device including the object of interest and a selected area (e.g., a specified border or framing area) surrounding the object of interest. The region-of-interest image data may be utilized to determine an initial proximity of the robot to the object of interest. The robot may then determine a target location for the robot based on the initial proximity of the robot to the object of interest and a target proximity of the robot to the object of interest. The target proximity of the robot to the object of interest may include a selected proximity for providing an optimal interaction between the robot and the object of interest. The robot may then move to the target location, which is located at the target proximity relative to the object of interest.

Accordingly, such robots may each utilize an imaging device simultaneously for multiple purposes. For example, the imaging device may be utilized by the robot to capture image data for virtual interactions, such as interactions where the robot acts as a proxy for one or more individuals to remotely interact with a person, another robot, and/or any other suitable object of interest in the vicinity of the robot. Simultaneously, the imaging device may be utilized to determine, based on tracked image data, an initial location of the robot with respect to the person or other robot and a target location for interacting with the person or other robot. Accordingly, in at least one embodiment, the robot may provide an optimal remote interaction experience without adding additional components to the robot. Thus, costs and complexity associated with such robots may be minimized while increasing the usefulness of the robots as proxies in remote interactions. In some embodiments, multiple imaging devices and/or audio sensing devices may be utilized to track image data and/or audio data, enabling the robots to detect and track individuals, other robots, and/or other objects of interest in a variety of environments.

The following will provide, with reference to FIG. 1, examples of systems for robots that are positionable to provide optimal interactions with individuals, other robots, and/or other suitable objects of interest. Additionally, the discussion corresponding to FIGS. 2-3B and 6 will provide examples of systems for positioning robots and providing optimal interactions with individuals, other robots, and/or other objects of interest. The discussion corresponding to FIGS. 4-5B will provide examples of imaging devices for use in interactive robots. Finally, the discussion corresponding to FIG. 7 will provide examples of methods for positioning robots to provide optimal interactions with individuals, other robots, and/or other objects of interest.

Figure 2:
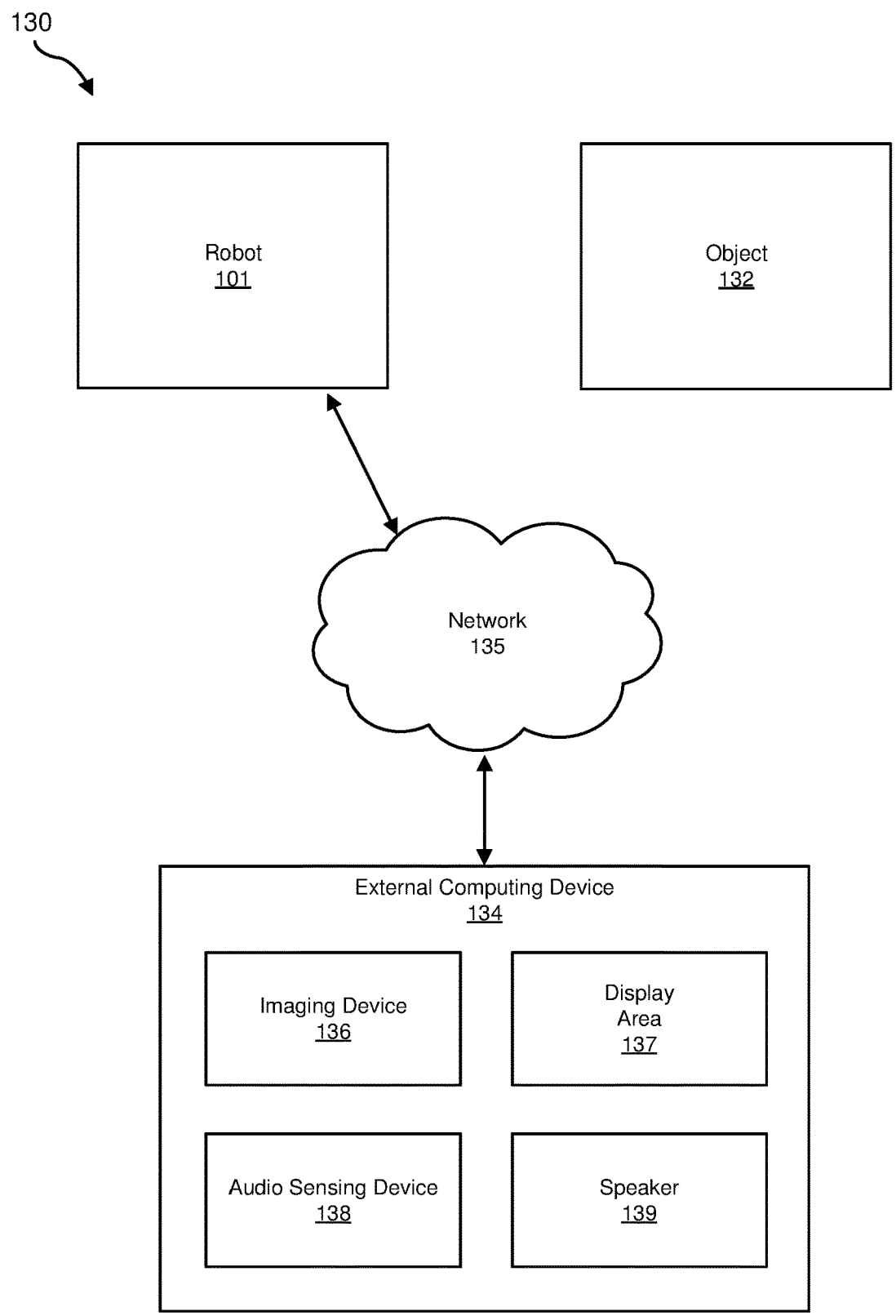
FIG. 2 is a block diagram of an exemplary system for positioning a robot for interacting with an object of interest in accordance with some embodiments.

FIG. 1 is a block diagram of an exemplary system 100 showing various system components, including computing device components, of system 100. FIG. 2 shows a block diagram of an exemplary system 130 for positioning a robot 101 for interacting with an object of interest 132. System 100 and system 130 may include at least one computing device that performs one or more tasks and transforms data by outputting instructions and/or signals that are utilized to perform various actions as described herein.

Robot 101 may be any suitable programmable mobile machine for autonomously carrying out one or more actions and or functions in an environment. The term "robot," as used herein, generally refers to any form of machine, programmable by a computer, capable of autonomously or semi-autonomously carrying out a complex series of actions or tasks. Examples of programmable mobile machines include, without limitation, robots, various aerial mobility systems (e.g., unmanned aerial vehicles), aquatic mobility systems (e.g., autonomous underwater or surface vehicles), and/or spacecraft mobility systems (e.g., unmanned spacecraft or probes) that are capable of omnidirectional movement on the ground, in the air, water, and/or space.

In some embodiments, system 100 shown in FIG. 1 may include one or more memory devices, such as memory 102. Memory 102 generally represents any type or form of volatile or non-volatile storage device or medium capable of storing data and/or computer-readable instructions. In one example, memory 102 may store, load, and/or maintain one or more modules 104 for performing various functions in relation to one or more of the subsystems described herein. Examples of memory 102 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory. In certain embodiments, modules 104 in FIG. 1 may represent one or more software applications or programs that, when executed by system 100, may cause a robot, such as robot 101 shown in FIG. 2, to perform one or more actions and/or tasks, such as actions performed by one or more subsystems (e.g., control subsystem 108, imaging subsystem 110, positioning subsystem 116, mobility subsystem 117, communication subsystem 118, display subsystem 120, audio subsystem 124, etc.) of system 100 as described herein.

As illustrated in FIG. 1, system 100 may also include one or more physical processors, such as physical processor 106. Physical processor 106 generally represents any type or form of hardware-implemented processing unit capable of interpreting and/or executing computer-readable instructions. In one example, physical processor 106 may access and/or modify one or more of modules 104 stored in memory 102. Additionally or alternatively, physical processor 106 may execute one or more of modules 104 to facilitate various actions performed by system 100. Examples of physical processor 106 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

System 100 may also include one or more subsystems for performing one or more tasks. For example, as shown in FIG. 1, system 100 may include a control subsystem 108 for controlling one or more other subsystems and/or components of system 100. For example, control subsystem 108 may direct one or more other subsystems of system 100 to carry out various actions and/or tasks. Additionally, control subsystem 108 may coordinate actions and/or tasks performed by various subsystems and/or components of system 100 with each other and/or with one or more systems and/or devices external to system 100.

In some embodiments, system 100 may include an imaging subsystem 110 that includes at least one imaging device 112 that generates image data (i.e., tracked image data 114) corresponding to a field of view of the at least one imaging device 112. Imaging device 112 may, for example, be a camera or any other suitable imaging device that includes an imaging sensor that receives light from a field of view of imaging device 112. In at least one example, imaging device 112 may be any suitable device capable of receiving light from a field of view of imaging device 112 and generating corresponding image data.

According to at least one embodiment, imaging subsystem 110 may detect one or more objects of interest in the field of view of imaging device 112. In at least one embodiment, imaging subsystem 110 may generate region-of-interest image data 115 that includes only a portion of tracked image data 114 corresponding to a region of interest of the field of view of imaging device 112 that includes at least one object of interest and a selected area surrounding the at least one object of interest. In some embodiments, tracked image data 114 and region-of-interest image data 115 may be stored in image data 113 of imaging subsystem 110. Additionally or alternatively, tracked image data 114 and/or region-of-interest image data 115 may be tracked in real time without capturing, processing, and/or storing tracked image data 114 and/or region-of-interest image data 115.

As shown in FIG. 1, system 100 may include a positioning subsystem 116 that generates positioning data for determining a proximity of robot 101 to objects of interest external to robot 101. For example, positioning subsystem 116 may determine an initial proximity of robot 101 to one or more objects of interest based on region-of-interest image data 115 generated by imaging subsystem 110. Positioning subsystem 116 may also determine a target location for robot 101 based on the initial proximity of robot 101 to the object of interest and a target proximity (e.g., a predetermined optimal proximity for interactions between robot 101 and one or more individuals) of robot 101 to the object of interest.

System 100 may also include a mobility subsystem 117. Mobility subsystem 117 may move robot 101 in one or more linear and/or rotational directions (for example, movement along a surface, aerial movement, etc.). In some embodiments, mobility subsystem 117 may, for example, include wheels, treads, and/or any other suitable movement mechanisms for displacing robot 101 in various directions along a plane or surface. Mobility subsystem 117 may also include at least one motor for driving components of mobility subsystem 117.

System 100 may also include a communication subsystem 118 that enables communication between robot 101 and one or more other robots and/or computing devices external to robot 101 via, for example, transmitted and/or received signals using any suitable communication technology and/or standard (e.g., WiFi communications, BLUETOOTH communications, cellular communications, mobile satellite communications, etc.). For example, communication subsystem 118 may include a communication antenna of robot 101 for wirelessly exchanging data with one or more other computing devices as will be described in greater detail below with reference to FIG. 2. In some embodiments, robot 101 may communicate via a wireless and/or wired connection with external devices either directly or via a suitable network, such as, for example, an intranet, a Wide Area Network (WAN), a Local Area Network (LAN), a low power wide area network (LPWAN) a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

According to at least one embodiment, system 100 may also include a display subsystem 120. Display subsystem 120 may include a display area 122 of robot 101 that displays images that are viewable by an individual. Images may be displayed based on display data 123, which may include, for example, display data received from a computing device external to robot 101, display data previously stored by system 100, and/or display data generated by system 100 (e.g., display data generated from image data captured by imaging device 112 from the local environment and/or other display data generated by system 100). Display subsystem 120 may enable a user to remotely interact with another individual in the vicinity of robot 101 via display area 122.

In some embodiments, system 100 may include an audio subsystem 124 that includes, for example, at least one audio sensing device 126 (e.g., a microphone, a sonic transducer, etc.) and/or at least one speaker 128 of robot 101. Audio subsystem 124 may enable further interaction between robot 101 and an individual via audio sensing device 126 and/or speaker 128. Audio subsystem 124 may include audio data 129, which includes audio data captured by audio sensing device 126 from the local environment and/or audio data to be played on speaker 128 (e.g., audio data received from a computing device external to robot 101, audio data previously stored by system 100, and/or audio data generated by system 100 based on, for example, audio data captured by audio sensing device 126 from the local environment).

Example system 100 in FIG. 1 may be implemented in a variety of ways. For example, all or a portion of example system 100 may represent portions of example system 200 in FIG. 2. In some embodiments, all or a portion of example system 100 may represent portions of robot 101 shown in FIG. 2 and/or portions of one or more computing devices external to robot 101, such as external computing device 134 and/or any other suitable computing device and/or computing network. For example, portions of imaging subsystem 110, display subsystem 120, and/or or audio subsystem 124 (e.g., imaging device 112, display area 122, audio sensing device 126, speaker 128 and so on) may include portions of robot 101. In this example, other portions of imaging subsystem 110, display subsystem 120, and/or or audio subsystem 124 shown in FIG. 1 may be include portions of robot 101 and/or portions of one or more computing devices external to robot 101. According to at least one embodiment, portions of example system 100 may represent portions of a cloud-computing or network-based environment. Cloud-computing environments may, for example, provide various services and applications via the Internet. These cloud-based services (e.g., software as a service, platform as a service, infrastructure as a service, etc.) may be accessible by, for example, robot 101 and/or external computing device 134, via any suitable remote interface. Various functions described herein may be provided through a remote desktop environment or any other cloud-based computing environment.

System 130 in FIG. 2 may include robot 101, which may be positioned in the vicinity of object of interest 132. The term "object of interest," as used herein, generally refers any suitable physical object and/or feature of a physical object that is recognizable by an imaging system and/or other sensor system of a robot, such as robot 101. For example, object of interest 132 may be a person or a portion of a person (e.g., a head or face of the person). In some embodiments, object of interest 132 may be at least a portion of another robot (e.g., a tracked feature of another robot). Object of interest 132 may be any other suitable object, without limitation, such as for example an animal or an inanimate object. While a single object of interest 132 is illustrated in FIG. 2, in some embodiments, robot 101 may be positioned to either simultaneously and/or consecutively interact with a plurality of objects of interest. As will be described in greater detail below, robot 101 may detect object of interest 132 in a field of view of an imaging device (e.g., imaging device 112 of imaging subsystem 110 shown in FIG. 1) of robot 101. For example, imaging device 112 may generate image data (i.e., tracked image data 114 in FIG. 1) corresponding to the field of view of imaging device 112. Imaging subsystem 110 may detect object of interest 132 in the field of view of imaging device 112 based on at least one feature of object of interest 132. Imaging subsystem 110 may then generate region-of-interest image data 115 (see FIG. 1) that includes only a portion of tracked image data 114 corresponding to a region of interest of the field of view of imaging device 112 including object of interest 132 and a selected area surrounding object of interest 132.

In some embodiments, positioning subsystem 116 (see FIG. 1) may determine an initial proximity of robot 101 to object of interest 132 based on image data captured by imaging device 112 (e.g., based on region-of-interest image data 115) and/or based on one or more other factors (e.g., based on audio data captured by audio subsystem 124 shown in FIG. 1). Positioning subsystem 116 may then determine a target location (e.g., an optimal location for interacting with object of interest 132) for robot 101 based on the initial proximity of robot 101 to object of interest 132 and a target proximity of robot 101 to object of interest 132. In some embodiments, the target proximity of robot 101 to object of interest 132 may be a predetermined proximity. For example, target proximity may be a predetermined proximity that is indicated as an optimal proximity for interaction of robot 101 with object of interest 132. In at least one embodiment, the target proximity of robot 101 to object of interest 132 may vary based on one or more characteristics of object of interest 132 (e.g., body language of a person, facial characteristics of a person, an emotional state of a person, sounds emitted by a person, etc.) and/or based on one or more other variables (e.g., characteristics of the local environment, the nature of the interaction, the time of day during which the interaction takes place, etc.). Mobility subsystem 117 shown in FIG. 1 may then move robot 101 to the target location. In some embodiments, robot 101 may interact with object of interest 132 (e.g., by capturing image data that includes object of interest 132, capturing audio data from object of interest 132, displaying images visible at object of interest 132, playing audio that is audible at object of interest 132, etc.) as robot 101 moves from an initial location to the target location and/or when robot 101 is positioned at the target location.

In at least one embodiment, robot 101 may communicate with at least one computing device and/or system, such as external computing device 134, that is external to robot 101. External computing device 134 may, for example, send image data (e.g., picture data, video data, etc.), audio data, instructions (e.g., instructions directing robot 101 to move to a specified location, instructions directing robot 101 to search for a specified person or object of interest, etc.), location data, and/or any other suitable data to robot 101. In some examples, external computing device 134 may, for example, transmit information to robot 101 indicating a location that robot 101 is assigned to operate in. For example, external computing device 134 may transmit a location identifier to robot 101, such as a building coordinate, a global positioning system (GPS) coordinate, a physical address, etc. According to some embodiments, robot 101 may transmit data to and/or receive data from external computing device 134 via a network 135. For example, robot 101 may transmit image data, audio data, location data, and/or any other suitable data to external computing device 134.

In some embodiments, robot 101 may act as a proxy enabling remote interaction between external computing device 134 and object of interest 132. For example, external computing device 134 may include an imaging device 136 that captures image data from a local area of external computing device 134 and an audio sensing device 138 that captures audio data from the local area of external computing device 134. External computing device 134 may also include a display area 137 that displays images that are visible in the local area of external computing device 134 and a speaker 139 that emits sounds that are audible in the local area of external computing device 134. A user of external computing device 134 may communicate with object of interest 132 via a robot 101. For example, the user may communicate with a person in the vicinity of robot 101 through image data, audio data, and/or other data (e.g., text data) transmitted between external computing device 134 and robot 101.

In some embodiments, robot 101 may be positioned and oriented such that at least a portion of object of interest 132, such as a person's face, is within a field of view of imaging device 112 of robot 101. Imaging device 112 may capture image data 113 (e.g., tracked image data 114 and/or region-of-interest image data 115) from the field of view that includes the person's face and may transmit the image data 113 to external computing device 134. The user of external computing device 134 may view displayed images based on image data 113 in display area 137 of external computing device 134. The user of external computing device 134 may be positioned in a field of view of imaging device 136. In at least one embodiment, external computing device 134 may transmit display data 123 (see FIG. 1) to robot 101 based on image data captured by imaging device 136 of external computing device 134. Accordingly, images of the user of external computing device 134 may be visible in display area 122 of robot 101 to the person (i.e., object of interest 132) in the vicinity of robot 101. Conversely, images of the person in the vicinity of robot 101 may be visible in display area 137 of external computing device 134 to the user of external computing device 134. Accordingly, the user of external computing device 134 and the person in the vicinity of robot 101 may visually interact with one another.

In some embodiments, audio sensing device 126 of robot 101 may capture audio data 129 from the person in the vicinity of robot 101 and may transmit the audio data 129 to external computing device 134. External computing device 134 may also transmit audio data captured by audio sensing device 138 of external computing device 134 to robot 101. Sounds from the user of external computing device 134 may be played by speaker 128 of robot 101 such that they are audible to the person in the vicinity of robot 101. Conversely, sounds from the person in the vicinity of robot 101 may be may be played by speaker 139 of external computing device 134 such that they are audible to the user of external computing device 134. Accordingly, the user of external computing device 134 and the person in the vicinity of robot 101 may audibly interact with one another.

External computing device 134 generally represents any type or form of computing device that is capable of reading computer-executable instructions. Examples of external computing device 134 include, without limitation, servers, desktops, laptops, tablets, cellular phones, wearable devices, embedded systems, robots, combinations of one or more of the same, or any other suitable computing device. In some embodiments, external computing device 134 may include another interactive robot positioned in the vicinity of the user.

Network 135 generally represents any medium or architecture capable of facilitating communication or data transfer. In one example, network 135 may facilitate communication between external computing device 134 and robot 101. In this example, network 135 may facilitate communication or data transfer using wireless and/or wired connections. Examples of network 135 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3A:
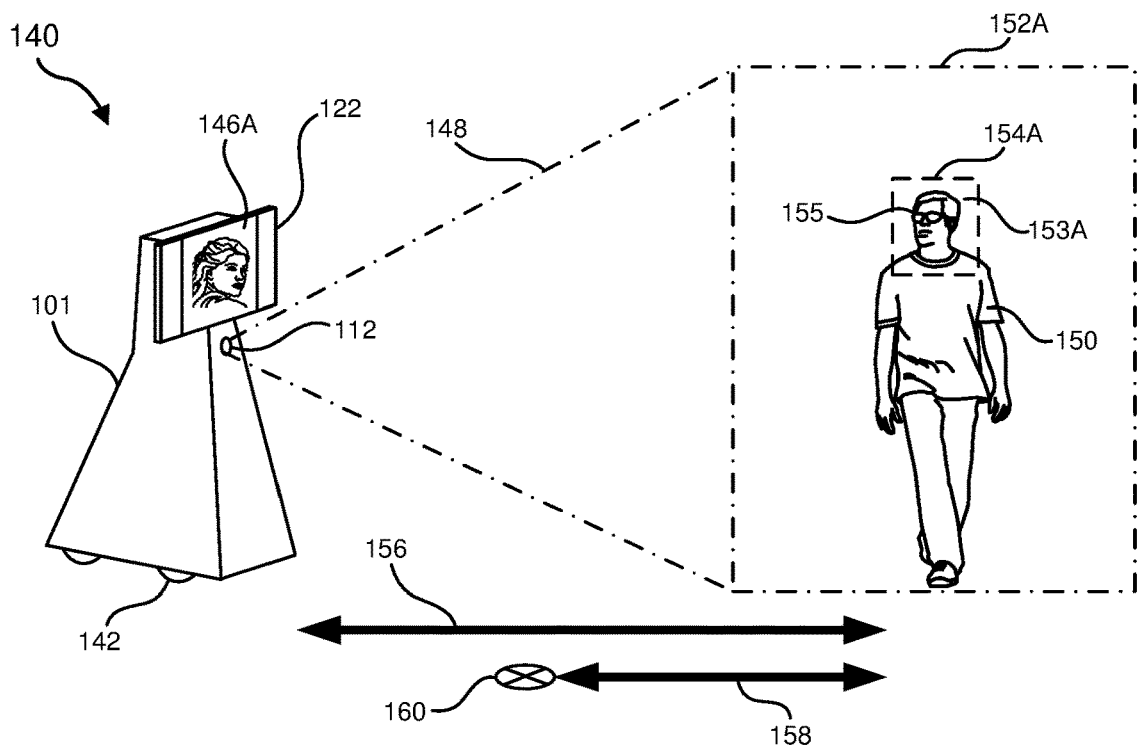
FIGS. 3A and 3B illustrate an exemplary system for positioning a robot for interacting with a person in accordance with some embodiments.
Figure 3B:
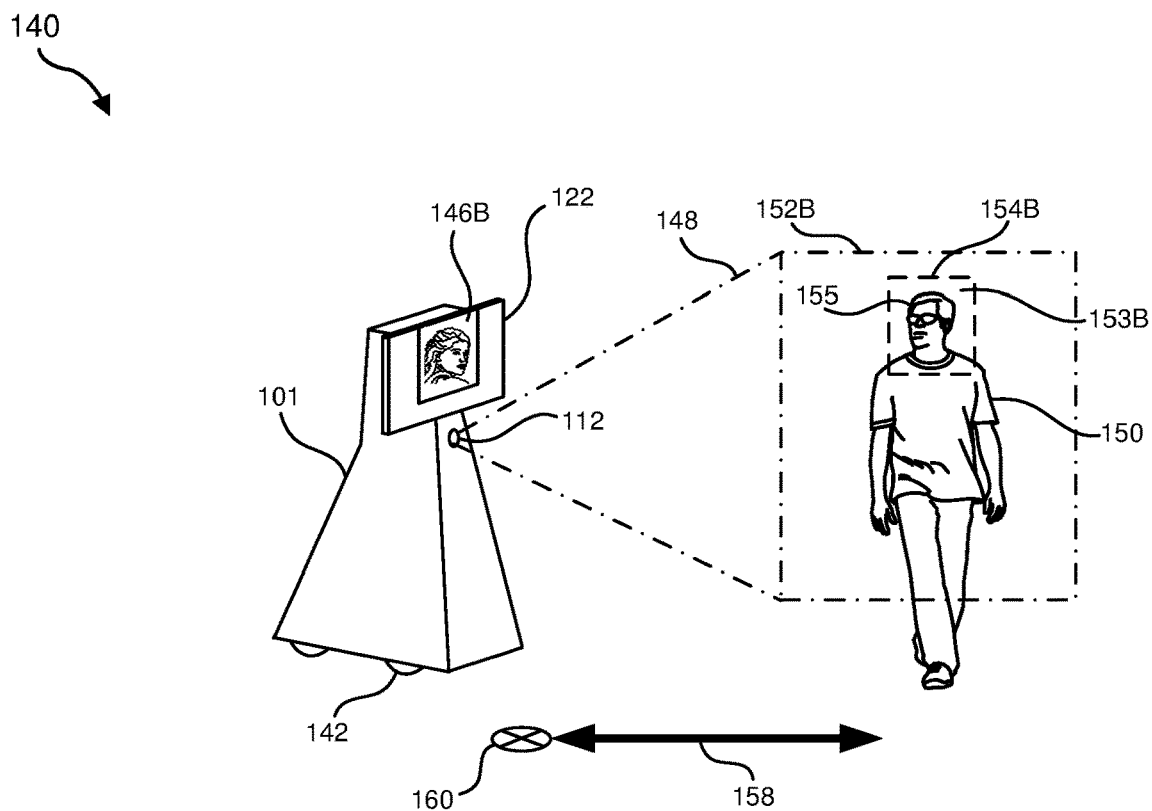

System 100 and/or system 200 may be implemented in a variety of ways and scenarios to accomplish any number of tasks and purposes. For example, system 100 and/or system 200 may be used to position robot 101 at a target location for interacting with a person, another robot, and/or other suitable object of interest in any suitable environment or location. FIGS. 3A and 3B illustrate an exemplary implementation of all or a portion of system 100 and/or system 200. As shown in these figures, system 140 may include robot 101 positioned in a vicinity of an object of interest, such as person 150. Robot 101 may include at least one imaging device 112 and display area 122. In some embodiments, robot 101 may also include wheels 142 for moving robot 101 along a surface, such as a ground, floor, and/or any other suitable surface, as part of mobility subsystem 117. Additionally or alternatively, robot 101 may include any other suitable components, such as treads, for moving robot 101 in an environment. According to some embodiments, robots may include various aerial mobility systems (e.g., unmanned aerial vehicles), aquatic mobility systems (e.g., autonomous underwater or surface vehicles), and/or spacecraft mobility systems (e.g., unmanned spacecraft or probes) that are capable of omnidirectional movement in air, water, and/or space.

As shown in FIGS. 3A and 3B, at least one imaging device 112 of robot 101 may generate image data corresponding to a field of view 148 of imaging device 112. Field of view 148 may include a total region, or a designated portion thereof, of an environment from which imaging device 112 may receive and detect image light at a given moment. As illustrated in these figures, at least a portion of person 150 may be positioned in field of view 148 such that image data corresponding to person 150, or at least a portion of person 150, is captured by imaging device 112 of robot 101. Region 152A represents a peripheral boundary of field of view 148 at a location that includes person 150.

In some embodiments, imaging device 112 may generate image data based one light received by imaging device 112 from field of view 148. Imaging subsystem 110 of system 100 (see FIG. 1) may track the image data (e.g., as tracked image data 114) generated by imaging device 112 and may detect person 150 in field of view 148 of imaging device 112 based on at least one feature of person 150 (e.g., based on facial and/or other anatomical features of the person, and/or any other suitable features) identified in tracked image data 114. For example, imaging subsystem 110 may use a facial recognition algorithm to determine the presence of person 150. In some embodiments, an identity of the person may be determined by imaging subsystem 110 based on features of the person, such as facial features of the person, and/or based on an identifier worn by the user, such as an identification code or number worn by the user. According to at least one example, imaging subsystem 110 may identify one or more features of person 150 based on at least frame of tracked image data 114 generated by imaging device 112.

According to some embodiments, imaging subsystem 110 may generate region-of-interest image data (e.g., region-of-interest image data 115 shown in FIG. 1) that includes only a portion of tracked image data 114 corresponding to a region of interest 154A of field of view 148 of imaging device 112. Region of interest 154A may include, for example, person 150 or a portion of person 150. In this example, region of interest may also include a selected area surrounding and framing person 150 or the portion of person 150. For example, as shown in FIG. 3A, region of interest 154A may include only a facial region 155 of person 150 and a selected area 153A (i.e., an image bounding or framing area) surrounding facial region 155.

Figure 4:
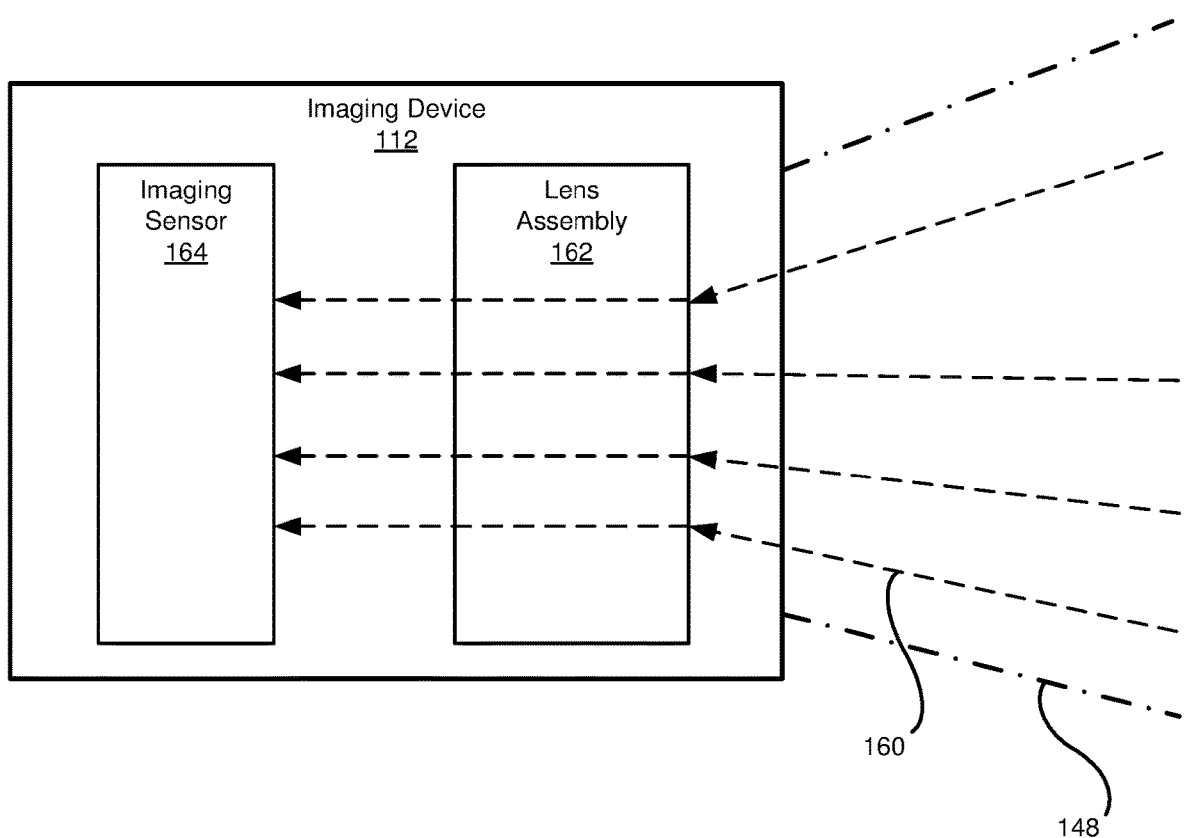
FIG. 4 illustrates an exemplary imaging device utilized in a robot in accordance with some embodiments.

Region-of-interest image data 115 may be generated by imaging subsystem 110 in various ways. FIG. 4 Illustrates an exemplary imaging device 112 according to some embodiment. Imaging device 112 may include any suitable camera or other imaging device capable of generating imaging data based on light received from field of view 148 of imaging device 112. In some examples, imaging device 112 may include, without limitation, a digital camera that converts captured light into digital signals, such as a camera having a charge-coupled device (CCD) imaging sensor, a camera having a complementary metal-oxide semiconductor (CMOS) image sensor, and/or any other suitable camera or imaging device. In some examples, imaging device 112 may include an imaging sensor having a two-dimensional array of light sensing elements (e.g., light sensing photodiode elements), a lens or lens array to focus light on the imaging sensor, and an aperture that allows incoming light to enter imaging device 112 and impinge on the imaging sensor. In at least one example, the imaging sensor may capture and measure light received from various regions of field of view 148 of imaging device 112. Imaging device 112 may generate region-specific image data based on the intensity of light received from various regions of field of view 148, as will be described in greater detail in reference to FIGS. 5A and 5B.

In at least one embodiment, as shown in FIG. 4, imaging device 112 may include an imaging sensor 164 and a lens assembly 162. As shown in FIG. 4, received light 161 from field of view 148 may be received by imaging device 112 (via, e.g., an aperture of imaging device 112). Lens assembly 162 may focus received light 161 on a front surface 166 of imaging sensor 164 such that received light 161 is incident on light sensing elements of imaging sensor 164. Lens assembly 162 may include, for example, a plurality of lenses for directing and focusing received light 161.

In at least one example, as discussed below in reference to FIGS. 5A and 5B, region-of-interest image data 115 may be generated by digitally cropping tracked image data 114 to include only a portion of tracked image data 114. For example, region-of-interest image data 115 may be generated by imaging subsystem 110 by digitally cropping tracked image data 114 to include only a portion of tracked image data 114 from a sub-region of imaging sensor 164 that receives light from region of interest 154A shown in FIGS. 3A and 3B.

Additionally or alternatively, lens assembly 162 may be adjusted to zoom in on a selected portion of field of view 148 by adjusting a focal length of lens assembly 162. Light from lens assembly 162 may be detected by imaging sensor 164, which may include, for example, an array of light sensing elements (e.g., photodiodes) that capture the incident light. In some embodiments, region-of-interest image data 115 may be generated by adjusting a focal length of lens assembly 162 to capture light from only a portion of field of view 148 (e.g., a portion corresponding to region of interest 154A shown in FIG. 3A). For example, imaging subsystem 110 may adjusts lens assembly 162 of imaging device 112 to increase field of view 148 imaging device 112 as mobility subsystem 117 moves robot 101 toward person 150. Conversely, imaging subsystem 110 may adjust lens assembly 162 of imaging device 112 to decrease field of view 148 of imaging device 112 as mobility subsystem 117 moves robot 101 away from person 150. According to at least one embodiment, robot 101 may include at least two imaging devices. A lens assembly of a first imaging device may remain in an un-zoomed state to generate tracked image data 114 corresponding to a broader field of view. At the same time, a lens assembly of an additional imaging device may be zoomed by adjusting the lens assembly to focus the additional imaging device on a relatively narrower field of view corresponding to a region of interest (e.g., region of interest 154A in FIG. 3A) to generate region-of-interest image data 115.

Returning to FIG. 3A, according to some embodiments, region of interest 154A may be selected to frame facial region 155 of person 150 by a predetermined amount and/or proportion. In some embodiments, region-of-interest image data 115 captured from region of interest 154A may be transmitted to an external computing device (e.g., external computing device 134 shown in FIG. 2). When a user of external computing device 134 views images based on the region-of-interest image data 115 in display area 137 of external computing device 134, the user may see only facial region 155 of person 150 and the portion of region of interest 154A framing facial region 155. Such a displayed view of facial region 155 may provide an optimal viewing experience for the user of external computing device 134 while interacting with person 150 via robot 101. In contrast to a wider view of person 150 captured from the entire field of view 148, images based on region-of-interest image data 115 captured from region of interest 154A may facilitate interaction between the user of external computing device 134 and person 150, enabling the user of external computing device 134 to, for example, clearly see facial features of person 150 on display area 137, providing an optimal interactive experience between the user of external computing device 134 and person 150.

In addition to facilitating interaction between the user of external computing device 134 and person 150, region-of-interest image data 115 may be utilized to determine a proximity of robot 101 to person 150. For example, positioning subsystem 116 of system 100 (see FIG. 1) may determine an initial proximity 156 of robot 101 to person 150 based on region-of-interest image data 115. For example, an extent of adjustments made by imaging subsystem 110 to generate region-of-interest image data 115 corresponding to region of interest 154A may be correlated to a distance between robot 101 and person 150. The region-of-interest image data 115 may, for example, correspond to region of interest 154A, which frames facial region 155 of person 150 by a selected amount. In some embodiments, an amount of digital cropping of tracked image data 114 captured by imaging device 112 from the entire field of view 148 to generate region-of-interest image data 115 may be correlated to the distance between robot 101 and person 150. For example, a proportion of tracked image data 114 digitally cropped to generate region-of-interest image data 115 may be determined and utilized to calculate the initial proximity 156 of robot 101 to person 150. The initial proximity 156 of robot 101 to person 150 may be calculated based on previously-identified correlations between amounts or proportions of captured image data digitally cropped (e.g., to generate region-of-interest image data corresponding to a selected image boundary around a user facial region) and distances between an imaging device and a user.

In some embodiments, an amount of mechanical adjustment of a lens array of imaging device 112 to generate region-of-interest image data 115 may be correlated to the distance between robot 101 and person 150. For example, a focal length of the lens array of imaging device 112 used to generate region-of-interest image data 115 may be determined and utilized to calculate the initial proximity 156 of robot 101 to person 150. The initial proximity 156 of robot 101 to person 150 may be calculated based on previously-identified correlations between lens array focal lengths (e.g., to generate region-of-interest image data corresponding to a selected image boundary around a user facial region) and distances between an imaging device and a user.

According to at least one embodiment, positioning subsystem 116 of system 100 may determine a target location 160 for robot 101 based on the determined initial proximity 156 of robot 101 to person 150 and a target proximity 158 of robot 101 to person 150. Target proximity 158 may, for example, be a predetermined proximity that facilitates interaction between person 150 and robot 101. In some embodiments, target proximity 158 may be an optimal distance between robot 101 and person 150, enabling person 150 to clearly see display area 122 of robot 101 while not causing discomfort to the user due to robot 101 encroaching in the user's comfort zone. Target location 160 may be closer to or further away from person 150 than the determined initial proximity 156 of robot 101. In some embodiments, positioning subsystem 116 may determine that robot 101 is currently located at an optimal location and proximity to person 150.

In some embodiments, positioning subsystem 116 may select and/or adjust target proximity 158 based on one or more factors. For example, positioning subsystem 116 may determine a likely emotional state and/or comfort level of person 150 (e.g., based on a determined expression of person 150, based on body language of person 150, based on sound received from person 150, such as words spoken by person 150, and/or any other suitable factors). Positioning subsystem 116 may select and/or adjust target proximity 158 of robot 101 to person 150 based on the likely emotional state of person 150. In some embodiments, positioning subsystem 116 may identify a target location that positions robot 101 for optimal interaction with person 150 when, for example, robot 101 is located behind or to a side of person 150. For example, positioning subsystem 116 may identify a target location that places robot 101 in front of a user to enable person 150 to better view and interact with robot 101. In at least one embodiment, positioning subsystem 116 may identify one or more features of person 150 based on at least one frame of tracked image data 114 and/or region-of-interest image data 115 generated by imaging subsystem 110. In this example, positioning subsystem 116 may select target proximity 158 based on the one or more features of person 150, such as, for example, a facial expression of person 150, a size (e.g., a height) of person 150, a posture of person 150, one or more physical gestures made by person 150, and so forth.

Mobility subsystem 117 (see FIG. 1) of robot 101, which includes wheels 142, may then move robot 101 to target location 160, which is a location disposed at the target proximity 158 to person 150. For example, mobility subsystem 117 may move robot 101 to target location 160, which is closer to person 150 than the initial position of robot 101, as shown in FIG. 3A. In some examples, mobility subsystem 117 may move robot 101 to a target location that is further from person 150 than the initial position of robot 101. In at least one example, positioning subsystem 116 may determine that robot 101 is currently located at an optimal location and/or proximity to person 150, and accordingly, robot 101 may not be moved from its current position.

In some examples, various images may be displayed in image region 146A of display area 122 of robot 101. For example, display area 122 may display an image of a user of an external computing device (e.g., external computing device 134) in image region 146A of display area 122. In some examples, an image region displayed in display area 122 may be adjusted based on a proximity of robot 101 to person 150. For example, when robot 101 is further from person 150, the image region displayed in display area 122 may be larger (i.e., may cover a larger proportion of display area 122). As shown, for example, in FIG. 3A, image region 146A may occupy a comparatively larger portion of display area 122. As robot 101 moves closer to person 150, the image region displayed by display area 122 may be adjusted.

For example, as robot 101 moves closer to person 150 (e.g., toward target location 160), the image region displayed by display area 122 may be reduced. FIG. 3B shows, for example, robot 101 located at target location 160, which is closer to person 150 then the initial proximity 156 of robot 101 shown in FIG. 3A. FIG. 3B shows an image region 146B that is reduced in size in comparison to the image region 146A shown in FIG. 3A. Adjusting the image region displayed by display area 122 in such a manner may provide a more comfortable viewing experience for person 150. Additionally, showing an enlarged image region in display area 122 when robot 101 is further from person 150 may enable person 150 to more clearly see images displayed in display area 122. As robot 101 approaches person 150, reducing the image region in display area 122 may ensure that images displayed to person 150 are perceived by person 150 in a more natural and/or comfortable manner that facilitates interaction between robot 101 and person 150. For example, image region 146B shown in FIG. 3B may display a facial region of another person (e.g., a user of external computing device 134 shown in FIG. 2) that approximates an actual facial region size.

In some embodiments, as robot 101 moves closer to person 150 (e.g., toward target location 160), imaging subsystem may generate region-of-interest image data 115 that progressively occupies a larger proportion of field of view 148 of imaging device 112 such that the region-of-interest image data 115 consistently corresponds to a facial region 155 of person 150 and a selected area surrounding facial region 155. For example, as shown in FIG. 3B, when robot 101 is closer to person 150, region of interest 154B may be selected to frame facial region 155 and a selected area 153B by a predetermined amount and/or proportion. Accordingly, region of interest 154B shown in FIG. 3B may occupy a larger proportion of field of view 148 of imaging device 112 (illustrated by region 152B corresponding to a periphery of field of view 148 at a location that includes person 150) in comparison to region of interest 154A shown in FIG. 3A. Conversely, as robot 101 may away from person 150, a region of interest may occupy a progressively occupy a smaller proportion of field of view 148 of imaging device 112. Thus, as robot 101 moves closer to or further away from person 150, an image of facial region 155 of person 150 that is displayed based on region-of-interest image data 115 may not change size from the perspective of the viewer (e.g., a user of external computing device 134 shown in FIG. 2).

Figure 5A:
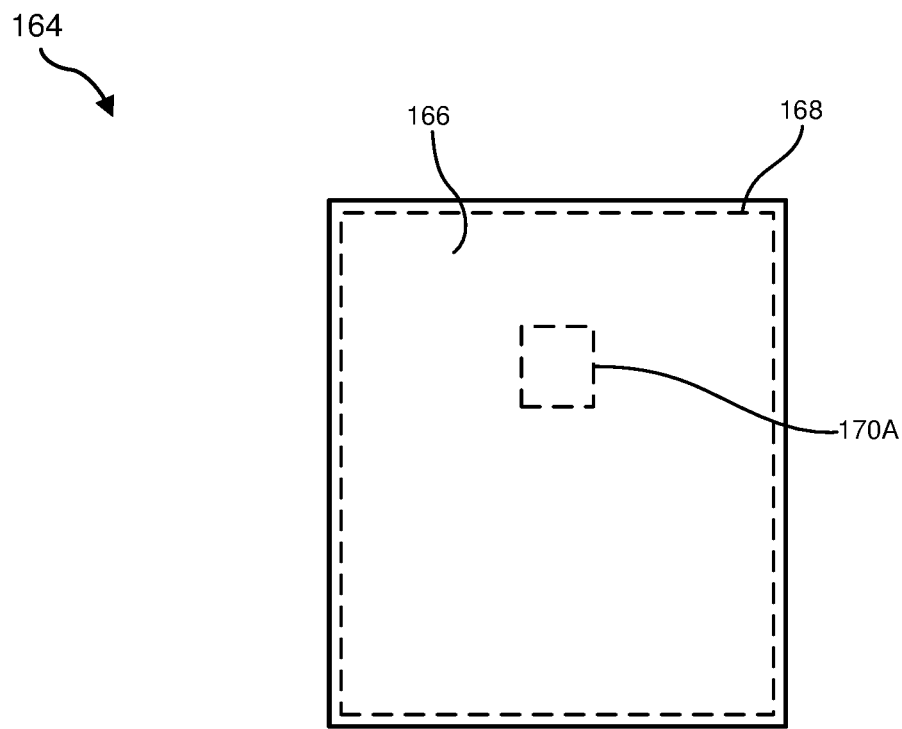
FIGS. 5A and 5B illustrate an exemplary imaging sensor of an imaging device in accordance with some embodiments.
Figure 5B:
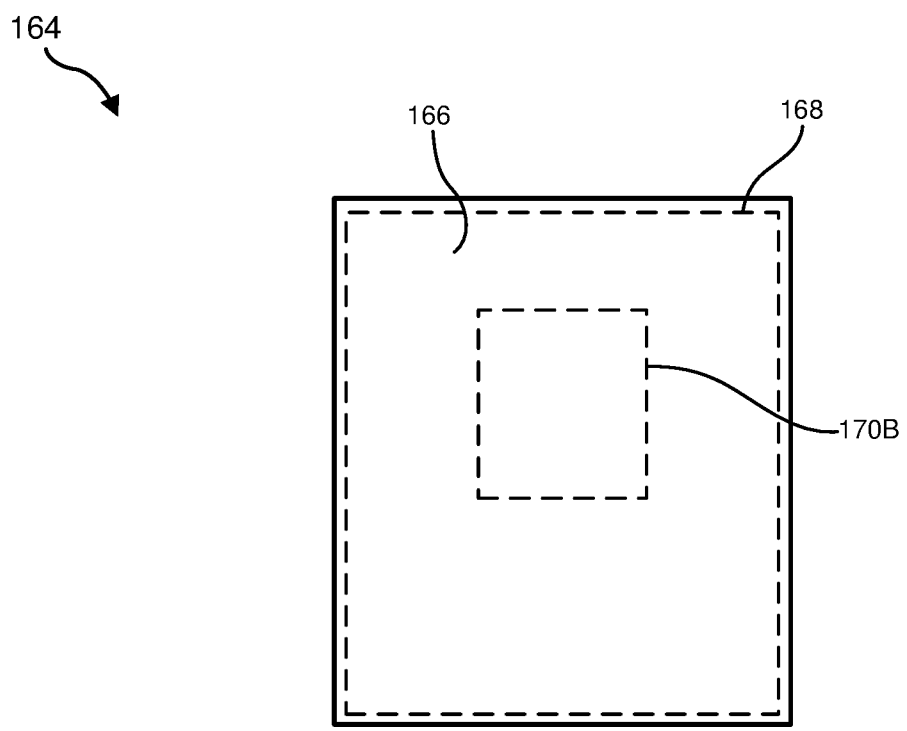

FIGS. 5A and 5B show a front view of an exemplary image sensor 164 of imaging device 112 according to some embodiments. FIG. 5A illustrates image sensor 164 when robot 101 is located relatively further away from person 150 (see, e.g., FIG. 3A) and FIG. 5B illustrates image sensor 164 when robot 101 is located relatively closer to person 150 (see, e.g., FIG. 3B). As shown in these figures, light received from field of view 148 of imaging device 112 may be incident on front surface 166 of imaging sensor 164. The light received from field of view 148 may be incident on a light sensing region 168 via front surface 166 of imaging sensor 164. In at least one embodiment, light sensing region 168 may cover or substantially cover a portion of imaging sensor 164 that includes light sensing elements for receiving light from field of view 148. Tracked image data 114 may, for example, be generated by imaging sensor 164 based on light received in light sensing region 168 of imaging sensor 164. A sub-region 170A of light sensing region 168 shown in FIG. 5A may correspond to a portion of imaging sensor 164 that, for example, receives light from region of interest 154A of field of view 148 (see FIG. 3A). In some embodiments, imaging subsystem 110 may generate region-of-interest image data 115 by digitally cropping tracked image data 114 to include only a portion of tracked image data 114 from sub-region 170A of light sensing region 168.

According to some embodiments, the sub-region of imaging sensor 164 corresponding to the region-of-interest of field of view 148 of imaging device 112 may increase as mobility subsystem 117 moves robot 101 toward person 150. Conversely, the sub-region of imaging sensor 164 corresponding to the region-of-interest may decrease as mobility subsystem 117 moves robot 101 away from person 150. For example, FIG. 5B shows image sensor 164 when robot 101 is located relatively closer to person 150 (see, e.g., FIG. 3B) than image sensor 164 shown in FIG. 5A. As illustrated in FIG. 5B, a sub-region 170B of light sensing region 168 may correspond to a portion of imaging sensor 164 that receives light from region of interest 154B of field of view 148 (see FIG. 3B). Sub-region 170B shown in FIG. 5B may occupy a larger proportion of light sensing region 168 than sub-region 170A shown in FIG. 5A. Accordingly, region-of-interest image data 115 generated by digitally cropping tracked image data 114 to include only a portion of tracked image data 114 from sub-region 170B may include a larger proportion of tracked image data 114 than region-of-interest image data 115 generated corresponding to sub-region 170A.

In some embodiments, system 100 may include at least one audio subsystem 124 (see FIG. 1) that includes an audio sensing device 126 (e.g., a microphone, a sonic transducer, etc.) of robot 101 that captures audio data from a local area of robot 101. For example, audio subsystem 124 may detect a sound emitted by person 150. If person 150 is not in field of view 148 of imaging device 112, mobility subsystem 117 of robot 101, which includes wheels 142 of robot 101, may position robot 101 so that person 150 is disposed in field of view 148 of imaging device 112. In at least one embodiment, robot 101 may include one or more audio sensing devices that may be utilized to determine a location of a person, such as person 150. In some examples, audio subsystem 124 may utilize beamforming to extract a specified sound source in an environment, including a relatively noisy environment, for purposes of locating a one or more people, such as person 150. For example, audio subsystem 124 may utilize voice recognition and/or predetermined phrases or commands to identify a particular individual. Audio subsystem 124 may also determine at least one of an initial proximity of robot 101 to person 150 or a target location of robot 101 based on sounds, such as vocal sounds, emitted by person 150.

Figure 6:
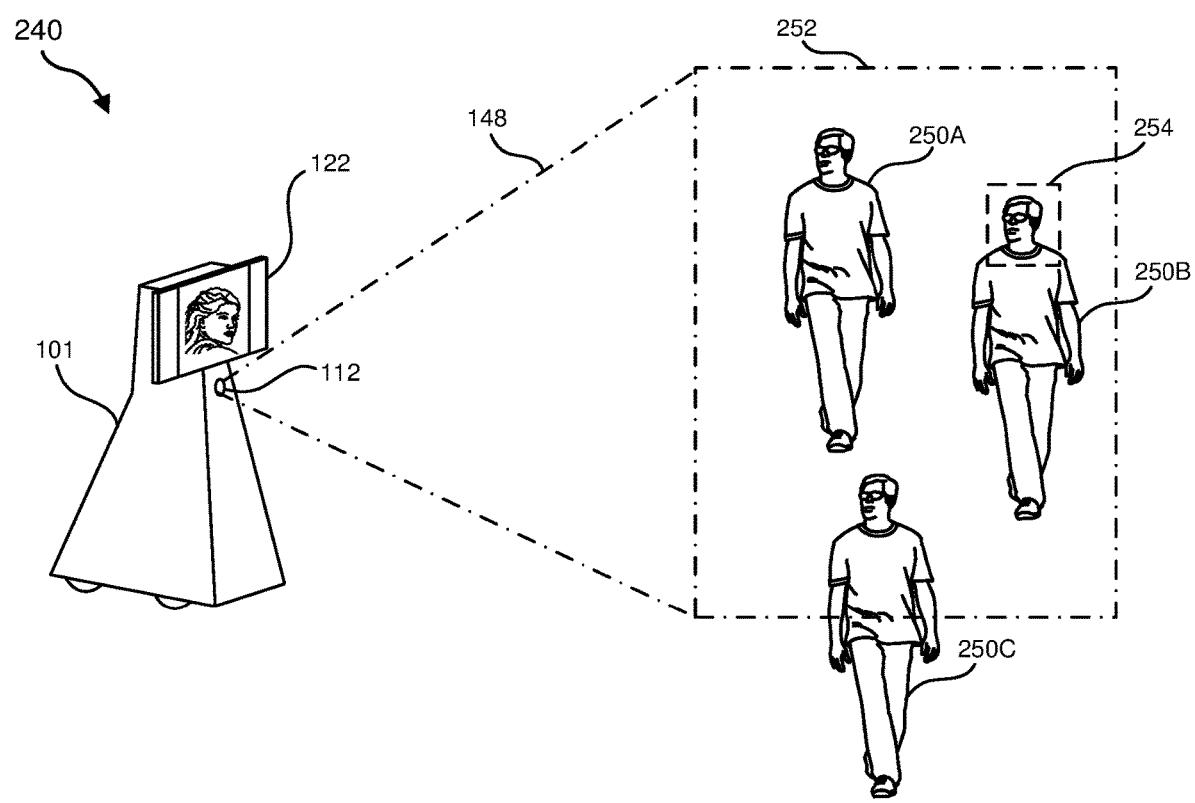
FIG. 6 illustrates an exemplary system for positioning a robot for interacting with one or more of a plurality of people in accordance with some embodiments.

In some examples, robot 101 may be located near a plurality of objects of interest. For example, robot 101 may be located near a group people such that more than one person is positioned in or near a field of view 148 of imaging device 112 of robot 101. For example, system 240 shown in FIG. 6 illustrates a group of people, including person 250A, person 250B, and person 250C. In this example, imaging subsystem 110 of system 100 may detect the plurality of people in field of view 148 of imaging device 112 (illustrated by region 252 corresponding to a periphery of field of view 148 at a general location that includes person 250A, person 250B, and person 250C). Positioning subsystem 116 may determine an optimal orientation and/or location of robot 101 relative to the plurality of people and/or one or more individuals of the plurality of people. For example, positioning subsystem 116 may utilize any of the techniques disclosed herein to determine a target location of robot 101 to optimize an interactive experience with one or more individuals of the plurality of people. Mobility subsystem 117 of system 100 may move robot 101 to the target location as described herein. Additionally, robot 101 may be oriented such that field of view 148 of imaging device 112 captures image data corresponding to one or more individuals of the plurality of people.

For example, as shown in FIG. 6, robot 101 may be positioned and oriented such that field of view 148 of imaging device 112 encompasses each of person 250A, person 250B, and person 250C. Accordingly, system 100 may generate image data (e.g., tracked image data 114 shown in FIG. 1) corresponding to at least a portion of person 250A, person 250B, and person 250C. In some examples, system 100 may generate region-of-interest image data (e.g., region-of-interest image data 115 shown in FIG. 1) corresponding to a region including one or more selected individuals of a plurality of people. For example, as shown in FIG. 6, imaging subsystem 110 of system 100 may generate region-of-interest image data 115 that includes only a portion of tracked image data 114 corresponding to a region of interest 254 of field of view 148 of imaging device 112 including a facial region of person 250B and a selected area surrounding the facial region of person 250B. Additionally or alternatively, system 100 may generate region-of-interest image data 115 that includes one or more portions of tracked image data 114 corresponding to any desired region of interest or plurality of regions of interest of field of view 148 of imaging device 112 (e.g., a region of interest or plurality of regions of interest that includes at least a portion multiple individuals, such as facial portions of the individuals).

According to at least one embodiment, robot 101 may include a plurality of imaging devices. In this example, positioning subsystem 116 of system 100 may additionally or alternatively determine an initial proximity of robot 101 to an object of interest, such as at least a portion of a person, based on image data generated by the plurality of imaging devices. For example, two or more imaging devices of robot 101 may be disposed facing in generally the same directions so as to provide three-dimensional or binocular image data of an environment. In some embodiments, two or more imaging devices of robot 101 may be disposed facing in different directions, providing an expanded field of view or multiple separate fields of view to imaging subsystem 110 of system 100. Such an expanded field-of-view may facilitate identification of objects of interest, such as individuals, in an environment. For example, individuals that might otherwise be positioned outside a field-of-view of a single imaging device 112 may be identified in an expanded field-of-view provided by a plurality of imaging devices.

Figure 7:
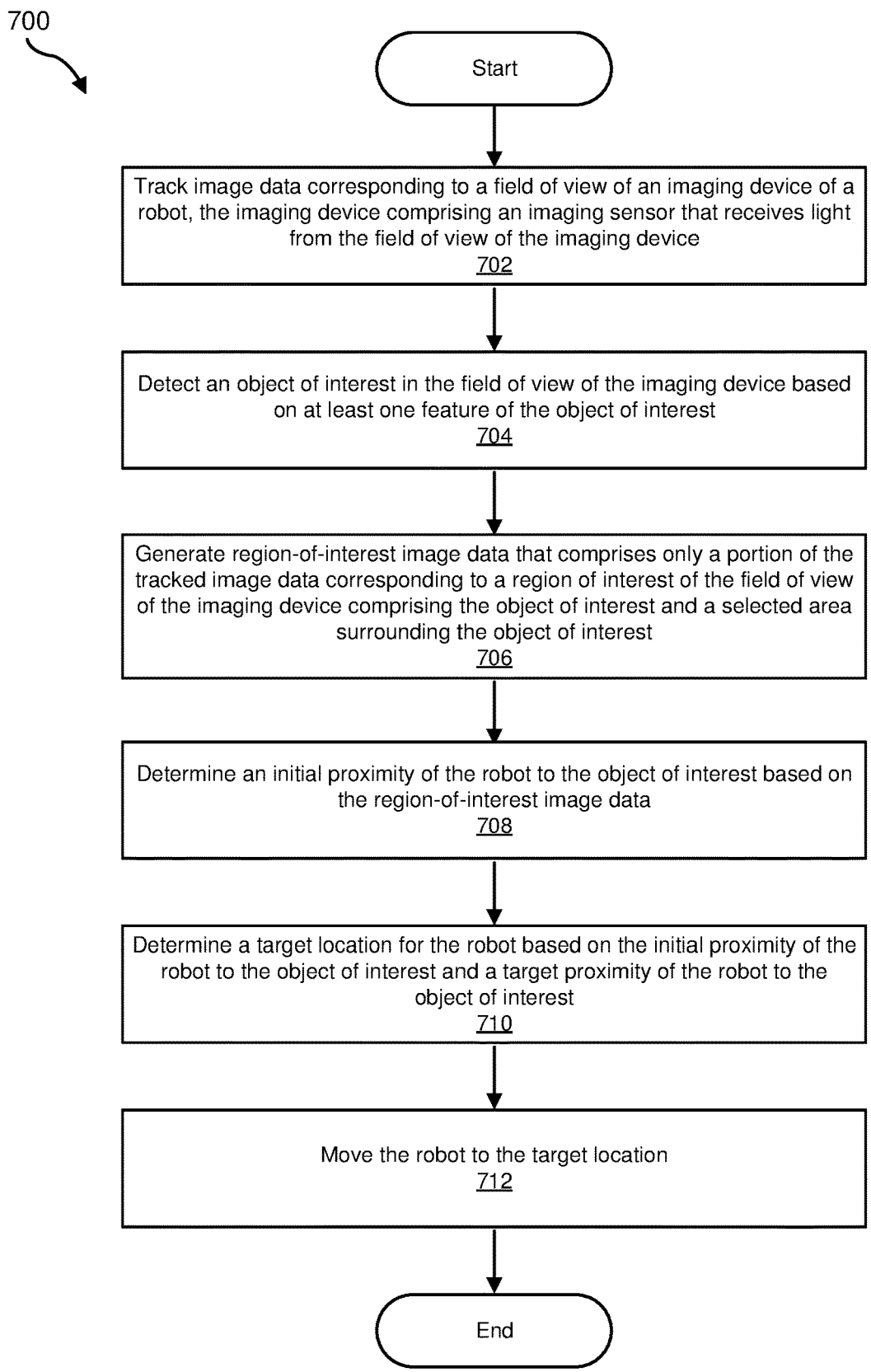
FIG. 7 is a flow diagram of an exemplary method for positioning a robot for optimal interactions in an interactive environment in accordance with some embodiments.

FIG. 7 is a flow diagram of an exemplary method 700 for positioning a robot for optimal interactions in an interactive environment. One or more of the steps shown in FIG. 7 may be performed and/or facilitated by any suitable computer-executable code and/or computing system, including system components of system 100 shown in FIG. 1, system 200 shown in FIG., and/or variations or combinations of one or more of the same. In one example, at least a portion of one or more of the steps shown in FIG. 7 may represent an algorithm whose structure includes and/or is represented by multiple sub-steps.

As illustrated in FIG. 7, at step 702, one or more of the systems and/or components described herein may track image data corresponding to a field of view of an imaging device of a robot. The imaging device may include, for example, an imaging sensor that receives light from the field of view of the imaging device. For example, imaging subsystem 110 may track image data (e.g., tracked image data 114) corresponding to a field of view 148 of imaging device 112 of robot 101 (see, e.g., FIGS. 1-6).

At step 704, one or more of the systems and/or components described herein may detect an object of interest in the field of view of the imaging device based on at least one feature of the object of interest. For example, imaging subsystem 110 of system 100 may detect object of interest 132 in the field of view of imaging device 112 based on at least one feature of object of interest 132 (see, e.g., FIGS. 1-3B and 6).

At step 706, one or more of the systems and/or components described herein may generate region-of-interest image data that includes only a portion of the tracked image data corresponding to a region of interest of the field of view of the imaging device including the object of interest and a selected area surrounding the object of interest. For example, imaging subsystem 110 of system 100 may generate region-of-interest image data 115 that includes only a portion of tracked image data 114 corresponding to a region of interest 154A of field of view 148 of imaging device 112 including object of interest 132 and a selected area surrounding object of interest 132 (see, e.g., FIGS. 1-6).

At step 708, one or more of the systems and/or components described herein may determine an initial proximity of the robot to the object of interest based on the region-of-interest image data. For example, positioning subsystem 116 of system 100 may determine an initial proximity 156 of robot 101 to object of interest 132 based on the region-of-interest image data 115 (see, e.g., FIGS. 1-3B and 5).

At step 710, one or more of the systems and/or components described herein may determine a target location for the robot based on the initial proximity of the robot to the object of interest and a target proximity of the robot to the object of interest. For example, positioning subsystem 116 of system 100 may determine a target location 160 for robot 101 based on initial proximity 156 of robot 101 to object of interest 132 and a target proximity 158 of robot 101 to object of interest 132 (see, e.g., FIGS. 1-3B and 5).

At step 712, one or more of the systems and/or components described herein may move the robot to the target location. For example, mobility subsystem 117 of system 100 may move robot 101 to target location 160 (see, e.g., FIGS. 1-3B and 5).

As discussed throughout the instant disclosure, the disclosed methods, systems, and devices may provide one or more advantages over conventional robots and robot systems. Robots disclosed herein may utilize an imaging device simultaneously for multiple purposes. The imaging device may, for example, be utilized by robots to track image data for virtual interactions, such as interactions where the robots act as proxies for one or more individuals to remotely interact with a person, another robot, and/or any other suitable object of interest in the vicinity of the robots. The imaging device may also be utilized to determine, based on the tracked image data for the remote interaction, an initial location of the robot with respect to the person or other robot and a target location for interacting with the person or other robot. Accordingly, robots disclosed herein may provide an optimal remote interaction experience utilizing imaging devices for multiple purposes. Thus, costs and complexity associated such robots may be minimized while increasing the usefulness of the robots as proxies in remote interactions.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. Additionally, while the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, to thereby enable others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a robot comprising:
      an imaging device that generates image data corresponding to a field of view of the imaging device, the imaging device comprising an imaging sensor that receives light from the field of view of the imaging device; and
      a mobility subsystem that moves the robot;
   an imaging subsystem that:
      tracks the image data corresponding to the field of view of the imaging device;
      detects an object of interest in the field of view of the imaging device based on at least one feature of the object of interest; and
      generates region-of-interest image data that comprises only a portion of the tracked image data corresponding to a region of interest of the field of view of the imaging device comprising the object of interest and a selected area surrounding the object of interest; and
   a positioning subsystem that:
      determines an initial proximity of the robot to the object of interest based on the region-of-interest image data; and
      determines a target location for the robot based on the initial proximity of the robot to the object of interest and a target proximity of the robot to the object of interest, wherein the mobility subsystem moves the robot to the target location;
   wherein:
   the image data depicts a person; and
   the imaging subsystem generates the region-of-interest image data by cropping the portion of the tracked image data that depicts a face of the person.

2. The system of claim 1, wherein the imaging subsystem generates the region-of-interest image data by digitally cropping the tracked image data to include only a portion of the tracked image data from a sub-region of the imaging sensor that receives light from the region of interest.

3. The system of claim 2, wherein:
   the sub-region of the imaging sensor corresponding to the region-of-interest increases as the mobility subsystem moves the robot toward the object of interest; and
   the sub-region of the imaging sensor corresponding to the region-of-interest decreases as the mobility subsystem moves the robot away from the object of interest.

4. The system of claim 1, wherein:
   the robot further comprises an additional imaging device; and
   the imaging subsystem generates the region-of-interest image data by adjusting a lens assembly of the additional imaging device such that the field of view of the additional imaging device includes only the region-of-interest.

5. The system of claim 4, wherein:
   the imaging subsystem adjusts the lens assembly of the additional imaging device to increase the field of view of the additional imaging device as the mobility subsystem moves the robot toward the object of interest; and
   the imaging subsystem adjusts the lens assembly of the additional imaging device to decrease the field of view of the additional imaging device as the mobility subsystem moves the robot away from the object of interest.

6. The system of claim 1, wherein:
   the robot further comprises a display area;
   the robot receives display data from at least one external computing device that is separate from the robot; and
   a display subsystem displays images in the display area based on the received display data.

7. The system of claim 6, wherein the mobility subsystem orients the robot such that the images displayed in the display area are optimally visible at a vantage point of the object of interest.

8. The system of claim 6, wherein the display subsystem changes the size of at least one image displayed in the display area as the mobility subsystem moves the robot toward the target location.

9. The system of claim 1, wherein the positioning subsystem: identifies one or more features of the object of interest based on at least one frame of at least one of the tracked image data or the region-of-interest image data; and selects the target proximity of the robot to the object of interest based on the one or more features of the object of interest.

10. The system of claim 1, wherein the object of interest comprises at least a portion of the person.

11. The system of claim 10, wherein: the object of interest comprises the person's face; and the imaging subsystem detects the person's face by facial recognition based on the tracked image data.

12. The system of claim 10, wherein the positioning subsystem: determines a likely emotional state of the person; and selects the target proximity of the robot to the portion of the person based on the likely emotional state of the person.

13. The system of claim 1, wherein the object of interest comprises a tracked feature of another robot.

14. The system of claim 1, further comprising an audio subsystem that generates audio data based on sounds received by at least one audio sensing device of the robot from a local area of the robot, wherein: the audio subsystem detects at least one sound emitted by the object of interest; and the mobility subsystem positions the robot so that the object of interest is disposed in the field of view of the imaging device.

15. The system of claim 14, wherein the positioning subsystem further determines at least one of the initial proximity of the robot to the object of interest or the target location of the robot based on the at least one sound emitted by the object of interest.

16. The system of claim 1, wherein: the imaging subsystem detects a plurality of objects of interest in the field of view of the imaging device; and the positioning subsystem determines an optimal orientation of the robot relative to the plurality of objects of interest.

17. The system of claim 1, wherein:
the imaging subsystem further comprises a plurality of imaging devices; and
the positioning subsystem further determines the initial proximity of the robot to the object of interest based at least partially on image data tracked by each of the plurality of imaging devices.

18. The system of claim 1, wherein the imaging subsystem and the positioning subsystem are each located on at least one of the robot or at least one external computing device that is separate from the robot.

19. A system comprising:
a robot comprising:
an imaging device that generates image data corresponding to a field of view of the imaging device, the imaging device comprising an imaging sensor that receives light from the field of view of the imaging device; and
a mobility subsystem that moves the robot;
an imaging subsystem that:
tracks the image data corresponding to the field of view of the imaging device;
detects an object of interest in the field of view of the imaging device based on at least one feature of the object of interest; and
generates region-of-interest image data that comprises only a portion of the tracked image data corresponding to a region of interest of the field of view of the imaging device comprising the object of interest and a selected area surrounding the object of interest; and a positioning subsystem that:
determines an initial proximity of the robot to the object of interest based on the region-of-interest image data; and
determines a target location for the robot based on the initial proximity of the robot to the object of interest and a target proximity of the robot to the object of interest, wherein the mobility subsystem moves the robot to the target location; and
an external computing device that displays at least one of the tracked image data or the region-of-interest image data in a display area that is separate from the robot;
wherein:
the image data depicts a person; and
the imaging subsystem generates the region-of-interest image data by cropping the portion of the tracked image data that depicts a face of the person.

20. A method comprising:
tracking image data corresponding to a field of view of an imaging device of a robot, the imaging device comprising an imaging sensor that receives light from the field of view of the imaging device;
detecting an object of interest in the field of view of the imaging device based on at least one feature of the object of interest;
generating region-of-interest image data that comprises only a portion of the tracked image data corresponding to a region of interest of the field of view of the imaging device comprising the object of interest and a selected area surrounding the object of interest;
determining an initial proximity of the robot to the object of interest based on the region-of-interest image data;
determining a target location for the robot based on the initial proximity of the robot to the object of interest and a target proximity of the robot to the object of interest; and
moving the robot to the target location;
wherein:
the image data depicts a person; and
the region-of-interest image data is generated by cropping the portion of the tracked image data that depicts a face of the person.

* * * * *